United States Patent

Obara et al.

[11] Patent Number: 5,843,369
[45] Date of Patent: Dec. 1, 1998

[54] STAINLESS STEEL FOR ANTI-FRICTION BEARING AND METHOD OF MAKING

[75] Inventors: Rikuro Obara; Yutaka Daikuhara, both of Nagano-ken, Japan

[73] Assignee: Minebea Kabushiki-Kaisha, Nagano-ken, Japan

[21] Appl. No.: 769,565

[22] Filed: Dec. 19, 1996

[30] Foreign Application Priority Data

Dec. 29, 1995 [JP] Japan ..................... 7-353788

[51] Int. Cl.⁶ .................................. C22C 38/18
[52] U.S. Cl. ................ 420/34; 420/71; 148/906; 148/325; 148/326
[58] Field of Search .................. 148/906, 325, 148/326; 420/34, 71; 75/501, 502

[56] References Cited

U.S. PATENT DOCUMENTS 5,531,836  7/1996  Dezzani et al. ................ 148/906

FOREIGN PATENT DOCUMENTS 404254572  9/1992  Japan ..................... 148/906

*Primary Examiner*—Deborah Yee
*Attorney, Agent, or Firm*—Lowe Hauptman Gopstein Gilman & Berner

[57] ABSTRACT

To provide a stainless steel for anti-friction bearings, which is obtained by making its eutectic carbide contents finer in particle diameter and suppressing the generation of non-metallic substances to an extremely low level, thus having a homogenious and dense structure and permitting highly accurate machining. The provided stainless steel is composed of 0.60 to 0.75% of carbon, 10.5 to 13.5% of chromium, 1.0% or below of silicon and 0.3 to 0.8% of manganese, % being by weight, the remainder of the composition being iron and inevitably introduced impurities, has a hardness of HRC 58 or above, contains eutectic carbide particles of 10 μm and below in diameter, and has oxygen and titanium concentrations each of 10 ppm or below.

10 Claims, 1 Drawing Sheet

STAINLESS STEEL FOR ANTI-FRICTION BEARING AND METHOD OF MAKING

BACKGROUND OF THE INVENTION

1. Field of the Invention

This invention relates to stainless steel for anti-friction bearings and, more particularly, to stainless steel suitable as the material of bearings used for rotary parts of precision apparatuses.

2. Description of the Prior Art

Heretofore, "SUS440C" (JIS Standard) class martensitic stainless steel has been used as the material of anti-friction bearings which are required to have corrosion resistance and wear resistance.

This stainless steel contains such large diameter particles as eutectic carbides, which are generated by eutectic reactions taking place during solidification of molten steel, and alumina and other non-metallic substances, which are generated as a result of chemical changes of impurities contained in the raw material of molten steel. Such eutectic carbides and non-metallic substances give rise to different steel cutting properties from the steel structure in situ and disable highly accurate cutting. Particularly, they disable highly accurate finish of the raceway grooves in the inner and outer rings of anti-friction bearings. Consequently, it is impossible to improve the rotational accuracy, and great noise is generated by vibrations which are caused during rotation. Therefore, it has been impossible to use this stainless steel for rotary parts of precision apparatuses such as precision measuring instruments or computer peripheral apparatuses.

To improve the processing accuracy of the stainless steel used for anti-friction bearings in the prior art, the eutectic carbide particles are made finer in diameter, for instance to about 10 $\mu$m, by a heat treatment in the steel manufacturing process. However, no stainless steel is available, which is manufactured by suppressing the generation of non-metallic substances. At any rate, it has been impossible to fabricate highly accurate anti-friction bearings.

SUMMARY OF THE INVENTION

An object of the invention is to provide a stainless steel for anti-friction bearings, which is homogenious and dense in structure and capable of being accurately machined.

To attain the above object, the stainless steel for anti-friction bearings according to the invention is obtained by reducing the particle diameter of its eutectic carbide contents and also suppressing the generation of the non-metallic substances to an extremely low level.

Specifically, the stainless steel for anti-friction bearings according to the invention is composed of 0.60 to 0.75% of carbon, 10.5 to 13.5% of chromium, 1.0% or below of silicon, and 0.3 to 0.8% of manganese, % being by weight, the remainder of the composition being iron and inevitably introduced impurities, has a hardness of HRC 58 or above, contains eutectic carbide particles of 10 $\mu$m and below in diameter, and has oxygen and titanium concentrations each of 10 ppm or below.

BRIEF DESCRIPTION OF THE DRAWING

The above and other objects, features and advantages of the invention will become more apparent from the detailed description of the preferred embodiment when the same is read with reference to the accompanying drawing, in which.

DETAILED DESCRIPTION OF THE PREFERRED EMBODIMENT

Figure 1:
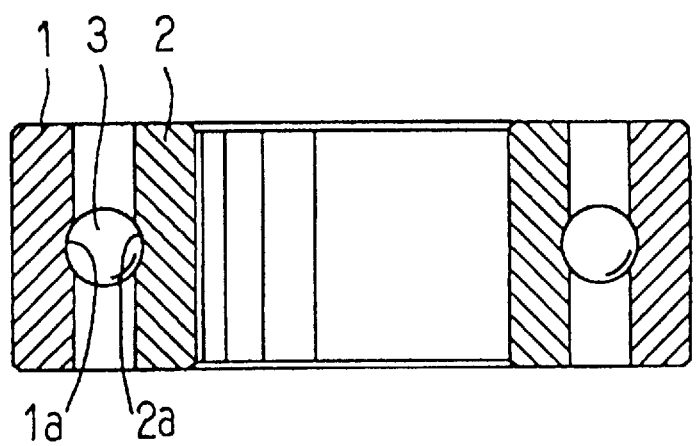
FIG. 1 is a sectional view showing an example of the anti-friction bearing using the stainless steel according to the invention.

The stainless steel for anti-friction bearings according to the invention will now be described in detail in connection with a case of using it for inner and outer rings of a ball bearing with reference to the annexed drawing.

Referring to the drawing, reference numeral 1 designates an outer ring having a raceway groove 1a formed in the inner periphery, and 2 an inner ring having a raceway groove 2a formed in the outer periphery. A plurality of balls 3 are provided as rolling elements between the raceway grooves of the inner and outer rings.

In this example, the inner and outer rings 2 and 1 of the ball bearing are made of the stainless steel according to the invention, and the balls 3 are made of a high carbon chromium bearing steel.

The balls 3 are made of the high carbon chromium bearing steel because of the facts that they are confined in the inner and outer rings and are not required to have so high corrosion resistance and also that the high carbon chromium bearing steel can be readily accurately machined compared to stainless steel and permits sufficient processing accuracy to be obtained, as well as being more inexpensive than stainless steel and permitting reduction of the cost of manufacture.

According to the invention, the stainless steel constituting the inner and outer rings is composed of 0.60 to 0.75% of carbon, 10.5 to 13.5% of chromium, 1.0% or below of silicon and 0.3 to 0.8% of manganese, % being by weight, the remainder of the composition being iron and inevitably introduced impurities, has a hardness of HRC 58 or above, contains eutectic carbide particles of 10 $\mu$m and below in diameter as set by heat treatment control, and has oxygen and titanium concentrations each of 10 ppm or below.

According to the invention, the titanium concentration in the stainless steel is managed to be 10 ppm or below by using a raw material with an extremely low content of titanium as impurity, thus suppressing to an extremely low level the generation of non-metallic substances which stem from titanium, such as titanium nitride generated by combination of titanium and nitrogen in the molten steel.

In the process of manufacturing the stainless steel according to the invention, the oxygen concentration in the stainless steel is reduced to 10 ppm or below by extending the time of purging gases from the molten steel, thus also suppressing to an extremely low level the generation of non-metallic substances which stem from oxygen, such as alumina generated by combination of a slight amount of aluminum contained in the raw material of the stainless steel and oxygen or silicon nitride generated by combination of silicon in the raw material and oxygen.

Since the stainless steel constituting the inner and outer rings of the ball bearing as described above has eutectic carbide particles reduced in diameter and contains an extremely suppressed level of generated non-metallic substances, it has a homogenious and dense metallic structure and permits highly accurate machining, thus permitting improvement of the quietness and rotational accuracy of the ball bearing.

Table 1 given below shows the results of tests which were conducted on a ball bearing with the inner and outer rings both made of the stainless steel according to the invention to determine vibrations and noise (or quietness). The tests were conducted in conformity to the AFBMA (The Anti-Friction Bearing Manufacturing Association, Inc.) Standards. The Table also shows for comparison the results of tests conducted on a ball bearing made of the conventional "SUS440C" (JIS Standards) class stainless steel. The test results are shown as Andelon values.

Like the stainless steel ball bearing according to the invention, in the prior art stainless steel ball bearing the high carbon chromium bearing steel was used for the balls.

TABLE 1

|  | Andelon value | |
|---|---|---|
|  | M | H |
| Stainless steel ball bearing according to the invention | 0.270 | 0.200 |
| Prior art stainless steel ball bearing | 0.473 | 0.418 |

In Table 1, the Andelon value columns shown as M and H correspond to respective measurement frequency bands, the column M corresponding to a medium frequency band (300 to 1,800 Hz) and the column H corresponding to a high frequency band (1,800 to 10,000 Hz). As shown, the smaller the Andelon value, the vibrations and noise are the less and the quietness is the superior.

In the above example both the outer and inner rings 1 and 2 were made of the stainless steel according to the invention. Depending on applications, however, only one of the two rings which is required to have high corrosion resistance and stable bonding strength, may be made of the stainless steel according to the invention, while using the high carbon chromium bearing steel for the other ring.

The stainless steel for anti-friction bearings according to the invention, having the constitution as described above, has the following functions and effects. Since the titanium and oxygen concentrations in the stainless steel are each made to be 10 ppm or below while the generation of non-metallic substances is suppressed to an extremely low level, the stainless steel has a homogenious and dense structure and permits highly accurate finish of the raceway grooves when used as the material of the anti-friction bearing, thus permitting great improvement of the quietness and rotational accuracy of the anti-friction bearing.

The non-metallic substances are hard compared to the stainless steel in situ, and with the conventional stainless steel the non-metallic substances which are present on the surface of the raceway grooves of the anti-friction bearing cause wear of the surface of the rolling elements. With the stainless steel according to the invention, in which non-metallic substances are generated extremely slightly, the rolling elements are less worn, and the life of the anti-friction bearing can be extended.

What is claimed is:

1. A stainless steel for an anti-friction bearing composed of 0.60 to 0.75% of carbon, 10.5 to 13.5% of chromium, 1.0% or below of silicon, and 0.3 to 0.8% of manganese, % being by weight, the remainder of the composition being iron and inevitably introduced impurities, having a hardness of HRC 58 or above, containing eutectic carbide particles of 10 $\mu$m and below in diameter, and having oxygen and titanium concentrations each of 10 ppm or below.

2. A stainless steel for an anti-friction bearing composed of 0.60 to 0.75% of carbon, 10.5 to 13.5% of chromium, 1.0% or below of silicon, and 0.3 to 0.8% of manganese, % being by weight, the remainder of the composition being iron and inevitably introduced impurities, having a hardness of HRC 58 or above, containing eutectic carbide particles of 10 $\mu$m and below in diameter, having a titanium concentration of 10 ppm or below, and having an oxygen concentration of 10 ppm or below by extending a time of purging gases from a molten steel in a process of manufacturing.

3. In a process of manufacturing for an anti-friction bearing a stainless steel having a hardness of HRC 58 or above and composed of 0.60 to 0.75% of carbon, 10.5 to 13.5% of chromium, 1.0% or below of silicon, 0.3 to 0.8% of manganese, % being by weight, and including steps of providing a titanium concentration of 10 ppm or below and providing eutectic carbide particles of 10 $\mu$m or below in diameter, the improvement comprising:

extending a time of purging gases from molten steel in the process to provide an oxygen concentration of 10 ppm or below.

4. The process recited in claim 3, wherein said step of providing a titanium concentration of 10 ppm or below comprises using a raw material having an extremely low content of titanium impurity.

5. The process recited in claim 3, wherein said step of providing eutectic carbide particles of 10 $\mu$m or below in diameter comprises setting a heat treatment control to provide said eutectic carbide particles with diameters of 10 $\mu$m or below.

6. The process recited in claim 5, wherein said step of providing a titanium concentration of 10 ppm or below comprises using a raw material having an extremely low content of titanium impurity.

7. In a process of manufacturing a stainless steel having a hardness of HRC 58 or above and composed of 0.60 to 0.75% of carbon, 10.5 to 13.5% of chromium, 1.0% or below of silicon, 0.3 to 0.8% of manganese, % being by weight, and including steps of providing a titanium concentration of 10 ppm or below and providing eutectic carbide particles of 10 $\mu$m or below in diameter, the improvement comprising:

extending a time of purging gases from molten steel in the process to provide an oxygen concentration of 10 ppm or below.

8. The process recited in claim 7, wherein said step of providing a titanium concentration of 10 ppm or below comprises using a raw material having an extremely low content of titanium impurity.

9. The process recited in claim 7, wherein said step of providing eutectic carbide particles of 10 $\mu$m or below in diameter comprises setting a heat treatment control to provide said eutectic carbide particles with diameters of 10 $\mu$m or below.

10. The process recited in claim 9, wherein said step of providing a titanium concentration of 10 ppm or below comprises using a raw material having an extremely low content of titanium impurity.

* * * * *